(12) United States Patent
Lin et al.

(10) Patent No.: US 12,175,433 B2
(45) Date of Patent: Dec. 24, 2024

(54) DYNAMIC TRUSTED ASSISTANCE NETWORK

(71) Applicant: KYNDRYL, INC., New York, NY (US)

(72) Inventors: Jimi Lin, Brossard (CA); Gregory J. Boss, Saginaw, MI (US); Michael Bender, Rye Brook, NY (US); Jeremy R. Fox, Georgetown, TX (US)

(73) Assignee: Kyndryl, Inc., New York, NY (US)

( * ) Notice: Subject to any disclaimer, the term of this patent is extended or adjusted under 35 U.S.C. 154(b) by 331 days.

(21) Appl. No.: 16/202,366

(22) Filed: Nov. 28, 2018

(65) Prior Publication Data

US 2020/0167735 A1 May 28, 2020

(51) Int. Cl.
| | |
|---|---|
| G06Q 10/00 | (2023.01) |
| G06Q 10/0631 | (2023.01) |
| G06Q 10/20 | (2023.01) |
| G06Q 50/00 | (2024.01) |

(52) U.S. Cl.
CPC ..... *G06Q 10/20* (2013.01); *G06Q 10/063112* (2013.01); *G06Q 50/01* (2013.01)

(58) Field of Classification Search
CPC .......................................... G06Q 10/00–50/00
USPC ...................................................... 705/7.14
See application file for complete search history.

(56) References Cited

U.S. PATENT DOCUMENTS

| | | | |
|---|---|---|---|
| 7,899,621 B2 | 3/2011 | Breed et al. | |
| 9,053,588 B1* | 6/2015 | Briggs | G07C 5/006 |
| 9,373,149 B2 | 6/2016 | Abhyanker | |
| 9,384,491 B1* | 7/2016 | Briggs | G06Q 30/0633 |
| 9,489,778 B2 | 11/2016 | Hering | |
| 9,646,439 B2 | 5/2017 | Ricci | |
| 9,652,748 B1* | 5/2017 | Sanchez | G06Q 10/1095 |
| 2005/0060323 A1* | 3/2005 | Leung | G05B 23/0275 |
| 2011/0213785 A1* | 9/2011 | Kristiansson | G06Q 50/01 |
| | | | 707/748 |
| 2013/0109427 A1 | 5/2013 | Matus | |
| 2013/0237254 A1* | 9/2013 | Papakipos | H04W 4/023 |
| | | | 455/456.3 |
| 2017/0099385 A1* | 4/2017 | Nguyen | H04M 7/003 |
| 2017/0232888 A1 | 8/2017 | Ricci | |
| 2019/0392367 A1* | 12/2019 | Gara | H04W 4/02 |

FOREIGN PATENT DOCUMENTS

CN           1885365 B      5/2010

OTHER PUBLICATIONS

Peter Mell et al, The NIST Definition of Cloud Computing, National Institute of Standards and Technology, Publication 800-145, 2011, entire document.

* cited by examiner

*Primary Examiner* — Mustafa Iqbal
(74) *Attorney, Agent, or Firm* — Erik Swanson; Andrew M. Calderon; Calderon Safran & Wright P.C.

(57) ABSTRACT

Aspects identify users as trusted assistant candidates in response to associations to purchases of vehicle repair items. Embodiments further select a one of the trusted assistant candidates that is linked to a vehicle operator as a social network contact and that is located closest to a vehicle location relative to remaining others of the trusted assistant candidates, in response to determining that the vehicle operator needs remote location assistance at the vehicle location; and dispatch the selected one of the trusted assistant candidates to the vehicle location to provide remote location assistance to the vehicle operator.

20 Claims, 5 Drawing Sheets

DYNAMIC TRUSTED ASSISTANCE NETWORK

TECHNICAL FIELD

The present invention relates generally to a method, system, and computer program product for a remote location assistance program. More particularly, the present invention relates to a method, system, and computer program product for selecting and dispatching trusted assistance to provide remote location assistance.

BACKGROUND

Operators of motorized or mechanical vehicles (for example, automobiles, trucks, motorcycles, bicycles) may experience equipment breakdowns and malfunctions that require on-site repair in order start, move and operate the vehicle safely, including to travel to an appropriate repair facility to correct the problem and assure safe operation. Accordingly, commercial, private and public remote location assistance programs offer repair or other assistance services wherein a service provider travels to a site that is different (remote) from a repair shop or medical facility location to directly offer assistance to correct acute mechanical and medical conditions, including in order to enable a recipient of the services to transport (or be transported) to a repair shop or medical facility in order to received more comprehensive services.

Remote location assistance programs include roadside assistance, wherein a tow-truck or other appropriate service equipment responds to a location of a vehicle breakdown to provide repair services to render the vehicle safely operational, or to convey or tow the vehicle to a repair facility to effect necessary repairs. On-site roadside assistance services may include jump-starting a motorized vehicle with a low-power battery, changing a flat tire, pulling a stuck vehicle out of snow, mud or other miring conditions, opening locked doors when keys are unavailable, and performing other on-site mechanical repairs.

Remote location assistance programs also include emergency medical or life safety assistance, wherein police, fire department, or emergency medical services or other service personnel respond to vehicle accidents or other emergencies to provide for extrication and ambulance transport, and to secure lanes of traffic (block traffic, provide warning lights or flares, etc.) to enhance safety around a disabled vehicle by preventing accidents. Remote location assistance programs also comprehend similar service offerings that are provided directly at off-road locations, such as on bodies of water such as rivers, lakes, ponds, pools, via boats or rafts or dry or wet suit attire; or at all-terrain vehicle or mining or timbering trails, mountain biking or hiking trails, and other wilderness locations.

BRIEF SUMMARY

In one aspect of the present invention, a computer implemented method includes identifying users as trusted assistant candidates in response to associations to purchases of vehicle repair items; in response to determining that a vehicle operator needs remote location assistance at a vehicle location, selecting a one of the trusted assistant candidates that is linked to the vehicle operator as a social network contact and that is located closest to the vehicle location relative to remaining others of the trusted assistant candidates; and dispatching the selected one of the trusted assistant candidates to the vehicle location to provide remote location assistance to the vehicle operator.

In another aspect, a computer system has a hardware processor in circuit communication with a computer readable memory and a computer-readable storage medium having program instructions stored thereon. The processor executes the program instructions stored on the computer-readable storage medium via the computer readable memory and thereby identify users as trusted assistant candidates in response to associations to purchases of vehicle repair items; in response to determining that a vehicle operator needs remote location assistance at a vehicle location, select a one of the trusted assistant candidates that is linked to the vehicle operator as a social network contact and that is located closest to the vehicle location relative to remaining others of the trusted assistant candidates; and dispatch the selected one of the trusted assistant candidates to the vehicle location to provide remote location assistance to the vehicle operator.

In another aspect, a computer program product has a computer-readable storage medium with computer readable program code embodied therewith. The computer readable program code includes instructions for execution which cause a processor to identify users as trusted assistant candidates in response to associations to purchases of vehicle repair items; in response to determining that a vehicle operator needs remote location assistance at a vehicle location, select a one of the trusted assistant candidates that is linked to the vehicle operator as a social network contact and that is located closest to the vehicle location relative to remaining others of the trusted assistant candidates; and dispatch the selected one of the trusted assistant candidates to the vehicle location to provide remote location assistance to the vehicle operator.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
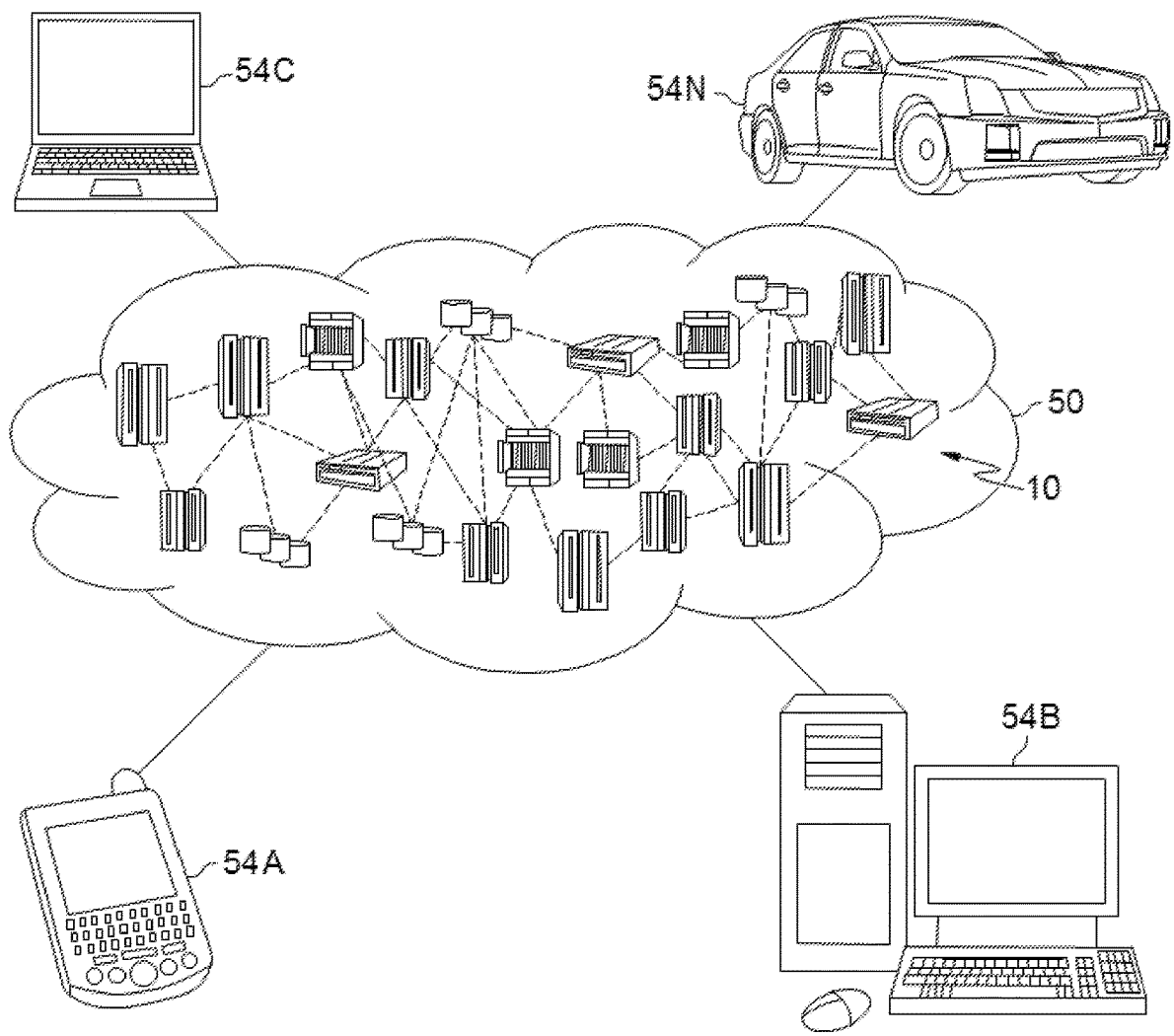
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and be rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
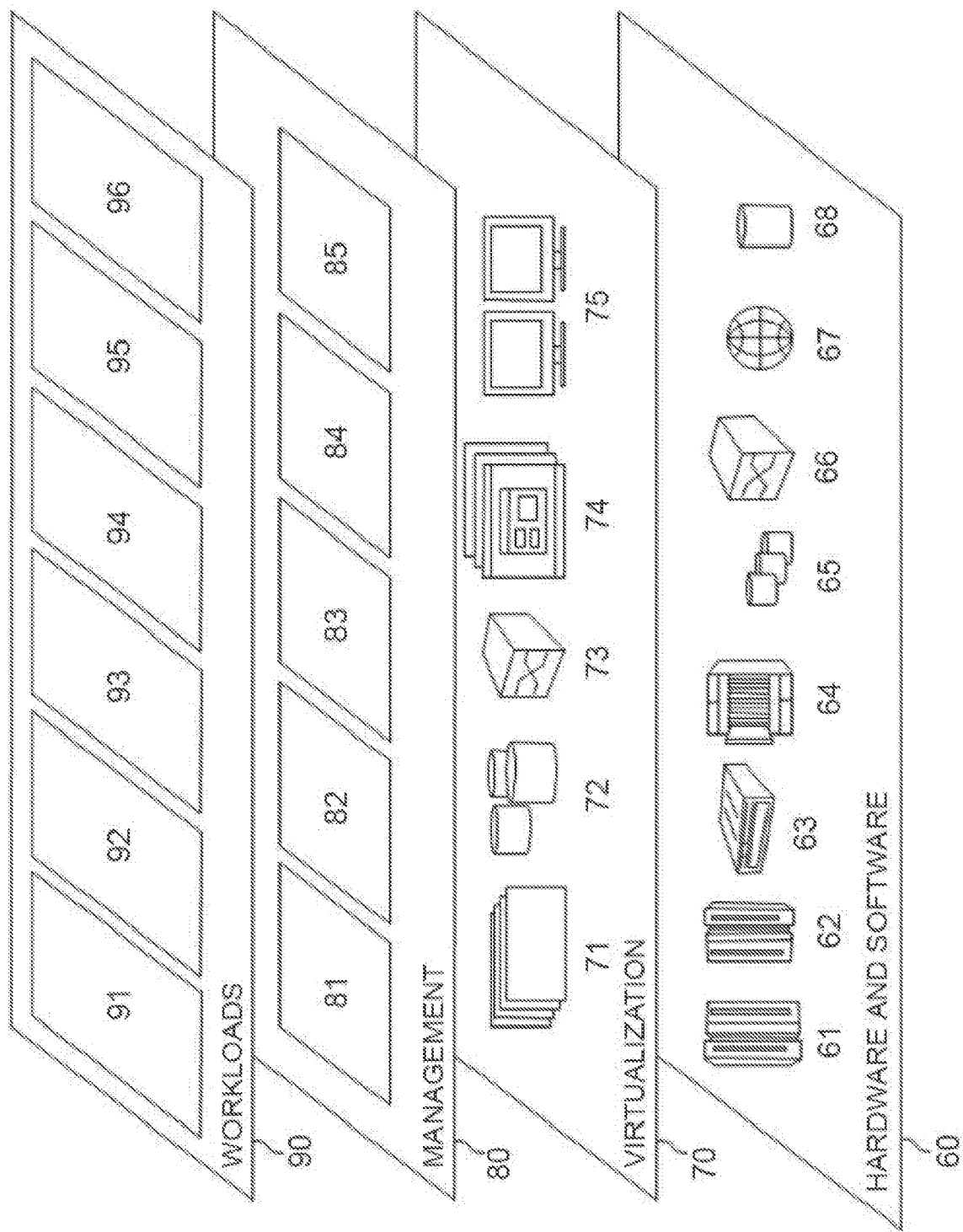
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for selecting a trusted assistant to provide remote location assistance as a function of social network data relationship data according to aspects of the present invention 96.

Figure 3:
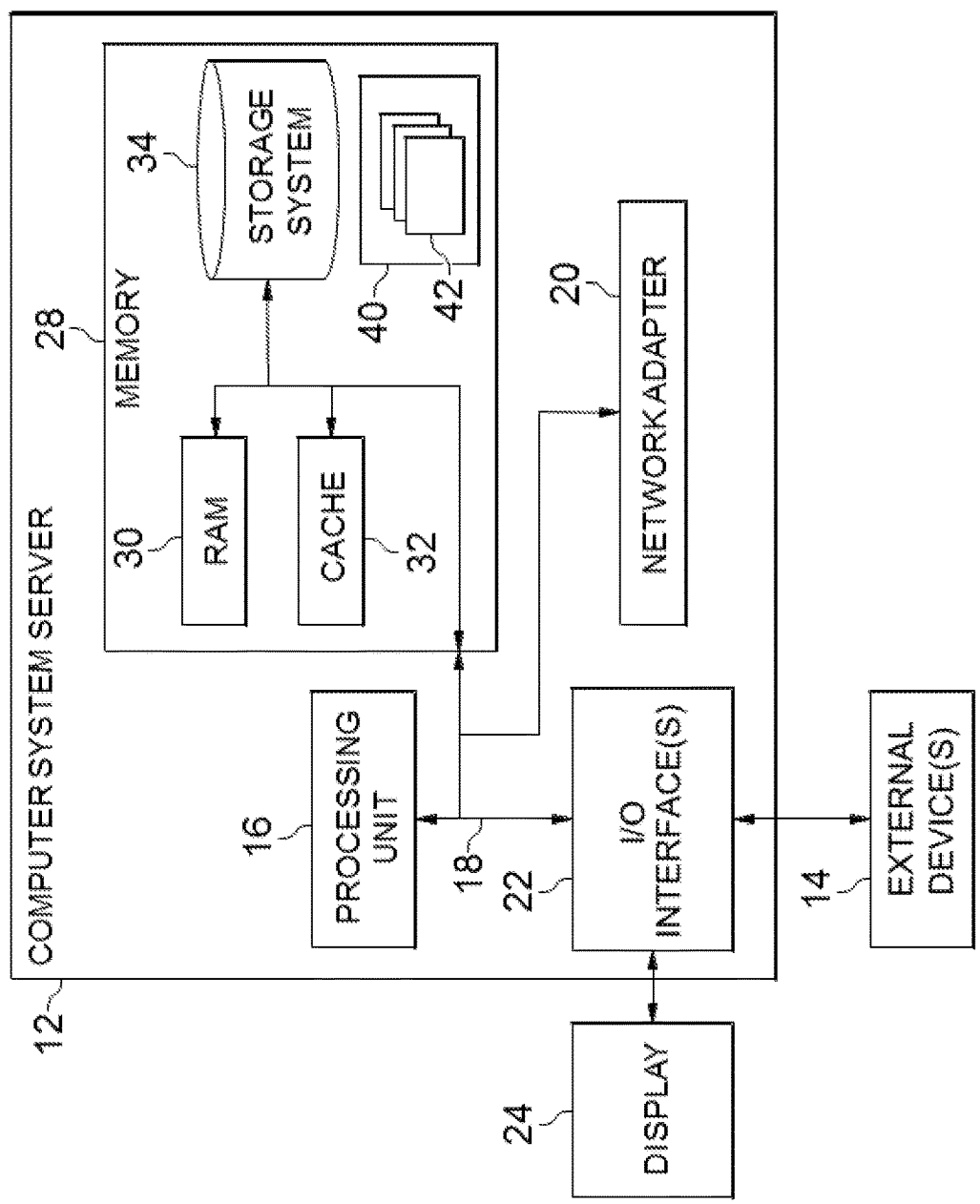
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Roadside and other remote location assistance programs refer to programs that have been historically provided via formal agreement with vehicle operators. Some vehicle manufacturers offer roadside assistance for their customers, generally in consideration for amounts paid to a dealer for purchase of a new vehicle. The American Automobile Association (AAA) is a membership-based organization in (at least) the United States of America that agrees to provide services to assist dues-paying members through dispatching fleet assistance vehicles. Automobile insurance companies also offer roadside assistance programs, in exchange for premium payments, typically requiring enhanced or additional premium amounts.

Government departments of transportation may also organize or manage highway assistance or safety patrols to keep the traffic moving and assist with highway emergencies as needed, including to secure lanes of traffic (block traffic, provide warning lights or flares, etc.) to enhance safety around a disabled vehicle by preventing accidents until public safety (police, fire department, or emergency medical) services can remove the vehicle or vehicle operator to a place of safety or service.

Problems arise in the prior art when conventional roadside assistance programs are unavailable to a stranded vehicle operator. For example, due to heavy demand for services during storms or extreme weather conditions, a higher number or frequency of calls for assistance may arise than may be accommodated by available public or private roadside assistance programs resources, wherein a vehicle operator may have to wait hours for assistance, and wherein delays in rendering service which may proportionally increase threats to personal safety and health of the stranded vehicle operator (for example, from an unsafe vehicle location relative to roadway traffic that presents a risk of being struck by another vehicle operator, or through untreated injuries or illnesses of the vehicle operators). Private entity roadside assistance program services may also be unavailable to vehicle operators due to failure to pay the dues, enhanced premiums, or other monetary consideration required for receiving such services.

Figure 4:
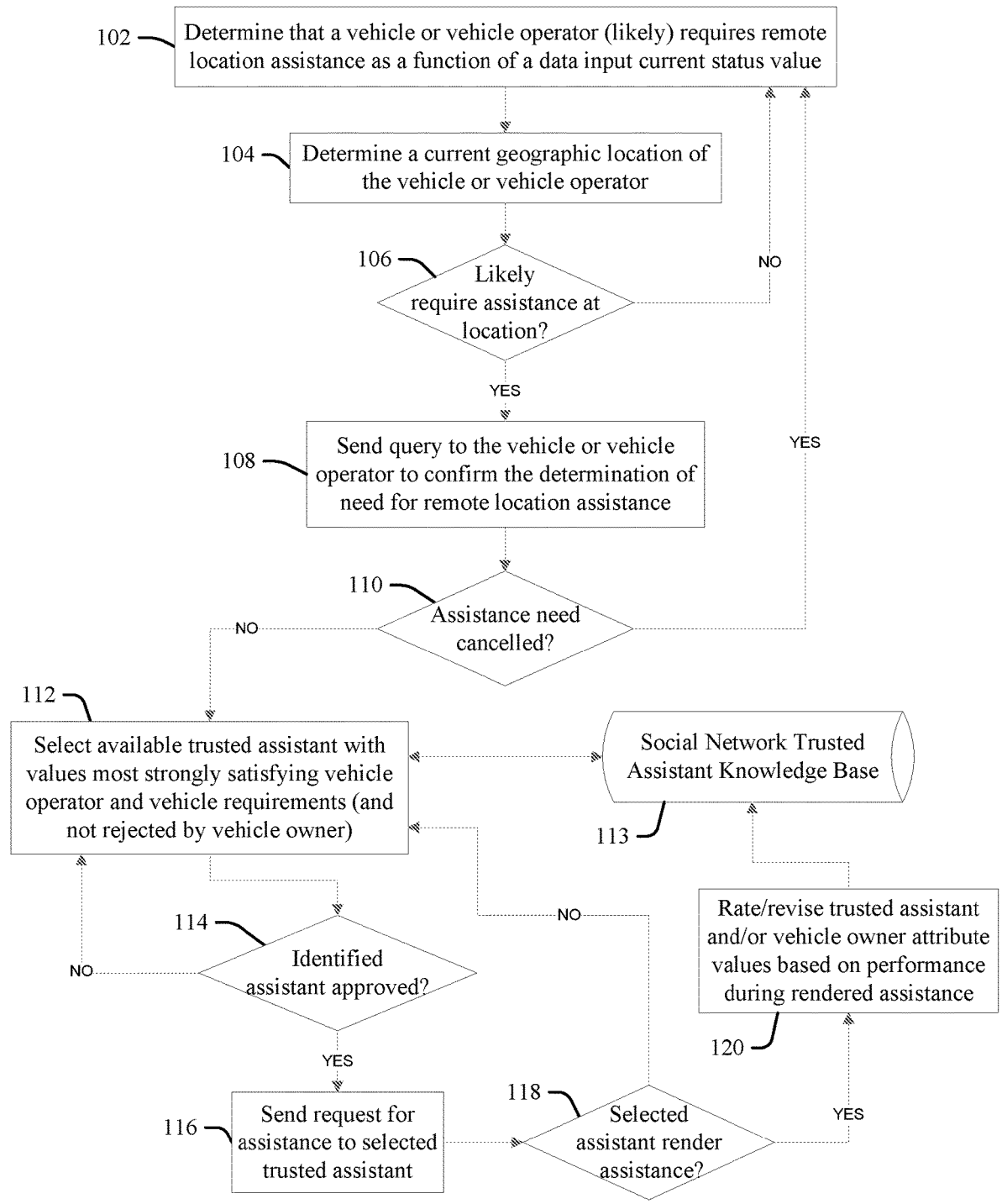
FIG. 4 is a block diagram illustration of an embodiment of the present invention.

FIG. 4 illustrates a process or system according to the present invention. At 102 a processor configured according to the present invention (the "configured processor") determines that a vehicle or vehicle operator (likely) requires remote location assistance as a function of a data input current status value. The determination at 102 is a function of one or more of an explicit request for remote location assistance from the vehicle operator or other entity, and a determination from vehicle sensor data or social network service activity associated to the vehicle operator. Thus, the configured processor may directly determine the occurrence of maintenance issue that (likely) requires remote location assistance to resolve from sensor data: illustrative but not exhaustive examples of a data input current status value include determining that a vehicle engine is not running and that an available power detected within a vehicle battery that is insufficient to start or move the vehicle; a detected tire pressure value that indicates a probable flat tire, an oil pressure or temperature value that is outside of safe or acceptable threshold values, etc.

The configured processor may also monitor the text content of social network service activity at 102 of postings by the vehicle operator, or that reference or "tag" the vehicle operator, that include text content values indicating that the vehicle operator needs remote location assistance. For example, the posting data text content may include a name of the vehicle operator in association with text content phrasing, such as "NAME is stuck in the mud on Cherry Hill, Help!", or "Darn it, I have another flat tire!", or "Whoa, I think I just hit something" in combination with "I am not sure if I can move my car" or ". . . and I don't even know where I am."

In response to determining that the vehicle or vehicle operator (likely) requires remote location assistance at 102, at 104 the configured processor determines a current geographic location of the vehicle or vehicle operator.

At 106 the configured processor confirms that the determination at 102 is likely as a function of the location data (for example, that the percentage of likelihood or confidence in the determination is equal to or greater than 50%). For example, with respect to a determination at 102 the vehicle requires towing as remote location assistance, in response to correlating the location determined at 104 to an address of an automobile repair shop that is currently open and offers towing service, at 106 the configured processor determines that it is unlikely that the vehicle operator needs the determined towing assistance; in contrast, in response to determining that the location determined at 104 is distant (for example, at least one kilometer) from any automobile repair shop location that is currently open, at 106 the configured processor confirms that it is likely that the vehicle operator needs towing service assistance.

In response to determining at 106 that it is unlikely that the vehicle operator needs the determined remote location assistance as a function of the current location (the "No" condition), the process returns to 102 (to thereby monitor for additional, revised or subsequent current status values, for additional iterations of the determination process at 102).

In response to determining (confirming) at 106 that it is likely that the vehicle operator needs the determined remote location assistance as a function of the current location (the "Yes" condition), at 108 the configured processor sends a query to the vehicle or vehicle operator to confirm the determination. Thus, the configured processor sends a text message to the vehicle operator, or calls the vehicle operator, etc., and queries (including via text-to-speech processes) the vehicle operator (for example, "We have received notification that your call has stalled and that your battery is too weak to start or move the car; do you need a jump-start or a tow truck?"). The configured processor may also send a diagnostic query to vehicle systems, confirming that the oil pressure and engine temperatures are consistent with a stalled vehicle, and that the mobile phone and thus the vehicle of the operator is stationary.

At 110 the configured processor determines whether the request has been (timely) cancelled in response to the query from the vehicle operator, via an affirmative answer with an appropriate value, such as spoken text content (for example, "No, I'm fine, I don't need a tow") or a graphical user interface (GUI) input (for example, the vehicle operator touching an icon on a touch screen that signals a cancellation); or from the vehicle (another or further diagnostic data values indicate that the determination at 102 is likely wrong, including in view of the location data determined at 104).

The determination at 110 is further response to a type of assistance determined at 102. For example, in response to data at 102 that indicates that the vehicle has been in an accident, a failure to receive any response from a vehicle component or vehicle operator at 110 may be presumed (interpreted) in view of the accident determination to indicate that it is likely that the relevant vehicle sensor is inoperable, or the vehicle operator is incapacitated and unable to respond, thereby resulting in confirmation of the need for assistance. A default confirmation via lack of response may also be based on time, for example in response to elapse of a time period allocated to await a response (for example one minute, five minutes, etc.) without receiving a confirming or cancellation response or data value. Illustrative but not exhaustive examples of accident indication data include a sudden acceleration or deceleration and stopping of movement, movement off of a roadway for an automobile or truck or bus that is not rated for off-road use values; vehicle or mobile device which include crash sensor; mobile device has suddenly stopped functioning in view of recent indication of sufficient battery power, water submersion detection or sound and motion data associated to indication of accident, or damage to phone indication, medical emergency beacon, fire impingement, and sensors reporting gas or oil loss, spills or leaking, etc.

Thus, if the determination for service is not cancelled at 110, at 112 the configured processor selects a "trusted assistant" to provide remote location assistance to the vehicle operator from a Social Network Trusted Assistant Knowledge Base 113 (local or network storage device, remote or cloud repository or service, etc.) universe (plurality) of available trusted assistants that has a social network relationship, rating, skill-set, tool and equipment, location, and availability value that best (most strongly) matches or satisfies the needs or requirements of the vehicle operator and the vehicle, and has not already been rejected by the vehicle operator or vehicle; and that is available (has not declined a request to offer assistance to the vehicle operator or vehicle, as discussed below).

At 114 the configured processor sends identification of the selected trusted assistant to the vehicle operator and requests that the vehicle operator confirm the selection at 112. If not accepted at 114, the process returns to 112 to iteratively identify and select the next, best-available trusted assistant not rejected by the vehicle operator at 114, until the vehicle operator accepts the selection at 114. Thus, embodiments select a closest trusted assistant user that has threshold acceptable values in each attribute, and that has not already been declined by the vehicle operator (in the present situation, or historically) for presentment and verification by the vehicle operator before a request for assistance is transmitted to the selected trusted assistant.

The approval process at 114 enhances perceived safety and confidence of the vehicle operator in the assignment of the person, company or service as the trusted assistant that is dispatched to perform remote location assistance, relative to the prior art. Prior art roadside assistance programs typically identify company names of commercial towing or emergency repair services dispatched, without providing specific identity information with respect to the persons actually dispatched. In contrast, the vehicle operator is enabled to review the social contact and other information of the suggested trusted assistant at 114, and decline candidates if they are not comfortable with their social network relationship to the vehicle operator: for example, declining distant contacts in favor of closer, first degree contacts (friends or family), (provided response times for the first degree contacts are not found unacceptable).

In response to confirmation by the vehicle operator of the selected trusted assistant at 114, at 116 the configured processor sends a request for assistance to the selected trusted assistant.

At 118 the configured processor determines whether the selected trusted assistant accepts the request to respond and render the appropriate, requested remote location assistance to the vehicle or vehicle operator; if not, the process returns to 112 to iteratively select the next, best-available trusted assistant (not already rejected by the vehicle operator at 114); otherwise, if so, the configured processor generally determines and sends notice of an estimate time of arrival (ETA) to the vehicle operator, and at 120 the configured processor rates or revises values within the Social Network Trusted Assistant Knowledge Base 113 of the attributes of the selected trusted assistant based on performance ratings in rendering the requested service or other feedback from the vehicle operator; and/or rates or revises the behavior values of the vehicle operator based on feedback from the selected trusted assistant.

Figure 5:
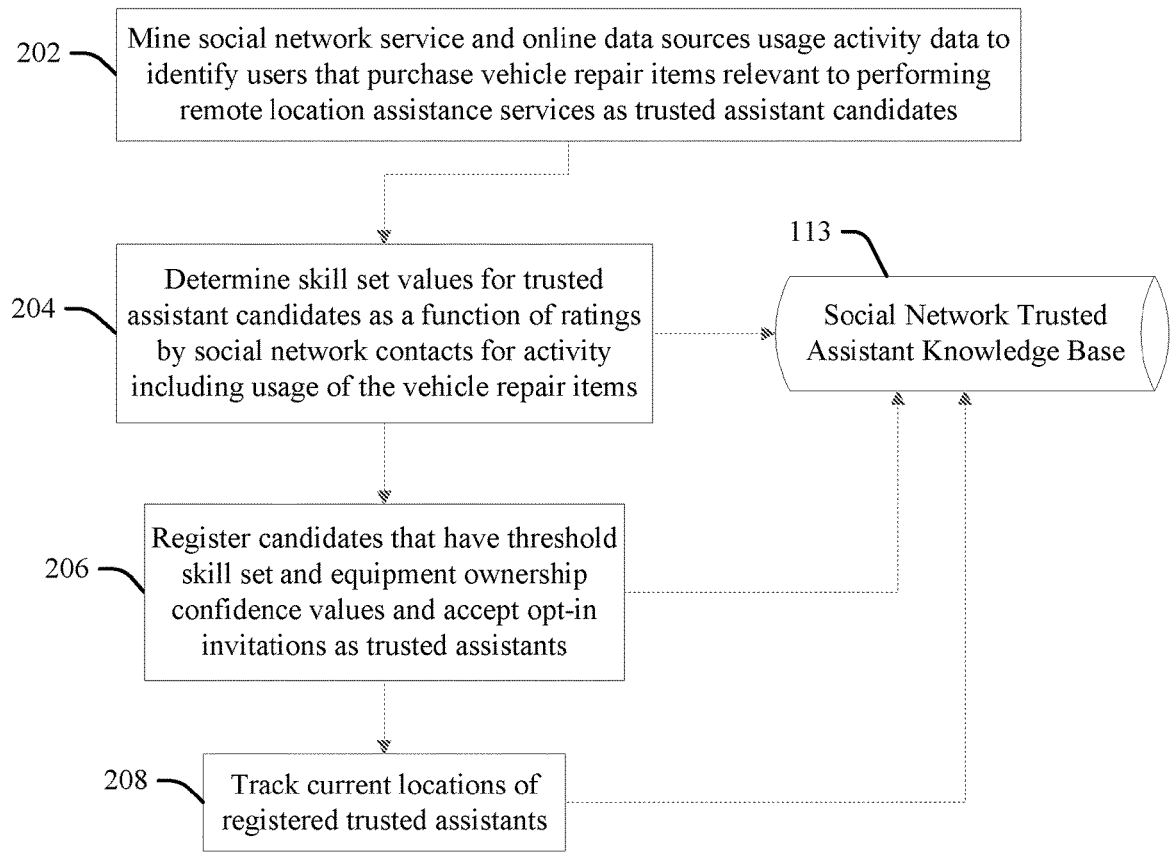
FIG. 5 is a block diagram illustration of another embodiment of the present invention.

FIG. 5 illustrates another aspect or embodiment according to the present invention that registers, tracks and maps trusted assistants within the Social Network Trusted Assistant Knowledge Base 113 as a function of relationships to other social network users and personal skill sets, availability, equipment, etc., for use in selecting an appropriate "trusted assistant" from the Social Network Trusted Assistant Knowledge Base 113 to provide remote location assistance to the vehicle operator at 112 (FIG. 4).

Thus, at 202 a processor configured according to the present invention (the "configured processor") mines (searches, crawls, etc.) social network services and other online data sources (use-nets, blogs, and other media content web sites, etc.) to identify users that are associated with access to (via purchasing or otherwise establishing ownership or control thereof) vehicle repair items that are relevant to performing remote location assistance services as trusted assistant candidates within the Social Network Trusted Assistant Knowledge Base 113. For example, at 202 the configured processor identifies item purchases or posted activities that have remote location assistance type attribute values of "tool," "automobile repair", "towing hardware," "fixing a flat tire," etc.

At 204 the configured processor determines and maps skill set values to the trusted assistant candidates as a function of ratings from other social network users with respect to activity including usage of (or otherwise related to) the vehicle repair items. In some embodiments, the trusted assistant candidates are linked to each of the rating users in a social network via friend, family, activity or other organizational criteria, or professional connections; alternatively, the ratings may be derived from and media content commenters, posters, taggers, contributors, etc., that are not linked to the trusted assistant candidates, or to the vehicle operator, as social network contacts.

For example, at 204 the configured processor maps a portable jump start kit to a first trusted assistant candidate with a high (100%) value for equipment ownership and access attribute (for example, to a designated field for an object defined for the jump kit item), in response to determining (via text content analysis) that another (second) user of a social network that is linked to the first trusted assistant candidate posted that the first trusted assistant candidate just received delivery of the item from an on-line purchase. The configured processor also assigns a 90% confidence skill set value to use of the portable jump start kit by the first trusted assistant candidate in remote location assistance services, in response to determining that the equipment type is "automobile repair equipment," and that social contacts of the first trusted assistant candidate have given her a cumulative, average rating score of 90% (4.5 stars on a five-star rating system) in proficiency for "automobile repair skills" in feedback ratings on historic remote location assistance activities (including at 120, FIG. 4).

Embodiments also predict likely skill set and equipment availability values mapped to trusted assistant candidates. For example, at 202 the configured processor also maps a portable tire inflation kit to the first trusted assistant candidate with a 67% (confidence) value for an equipment access attribute, in response to determining that 67% of purchasers of the portable jump start kit also purchase portable tire inflation kits (for example, as indicated by general online purchase activity data of users sharing demographic data value(s)).

At 206 the configured processor registers trusted assistant candidates that have threshold (minimum quality) skill set and equipment ownership confidence values and accept opt-in invitations as "registered trusted assistants" within the Social Network Trusted Assistant Knowledge Base 113. In some embodiments the opt-in invitations must be issued by (or approved by) other registered trusted assistants, in order to enhance the reliability of the registration process (so that the persons are essentially vouched for by other trusted, peers, who may be held accountable if the referred person fails to perform acceptably (gets poor ratings from other users, etc.).

Some embodiments generally condition registration of trusted assistant candidates on agreement to allow the system to track their availability and location. Such embodiments provide additional lower response-time advantages relative to the prior art: by continually assuring that the locations of available registered trusted assistants are dynamically known, they may more efficiently select and dispatch a trusted assistant for a remote location assistance tasks. This is contrasted to prior art systems that typically experience increased dispatch and overall response times due to the time lost in contacting and determining that a possible service provider is unavailable, prior to selecting an available candidate, with each iteration adding to a total response time until a service provider is found that is available.

Thus, embodiments of the present invention select the best available (not rejected) "trusted assistant" to provide remote location assistance to a vehicle operator (at 112, FIG. 4) as a function of best values of one or more, or a combination value determined therefrom, of attributes including social network relationship, skill-set and performance ratings, and tool and equipment access in meeting the needs or requirements of the vehicle operator and the vehicle at the particular location of the vehicle; the selection further responsive to the personal needs, preference and selections history of the vehicle operator. Thus, the skill-set and tool and equipment access values must generally match the needs of the vehicle operator: for example, automobile repair skills and tools for a stranded motorist, or bicycle repair skills and tools for a mountain biker stranded on a trail with a broken chain, etc.

Some embodiments differentially weight and consider attribute values in the selection of suggested trusted assistant. For example, relationship with a stranded vehicle operator may be rated most highly, wherein a first trusted assistant that is friend or relative of a vehicle operator but is currently located farther away is selected over another, second trusted assistant that is located more proximate to the vehicle operator, provided the longer estimated time of arrival (ETA) for the first assistant does not exceed an applicable threshold maximum ETA specified by the vehicle operator (or system settings).

For example, Tom becomes stuck in snowy weather on his way home from work. The vehicle senses its stuck condition and reports same to an embodiment of the present invention, which searches Tom's trusted social networks for anyone nearby that has any of a list of specific equipment associated with extricating a stuck vehicle: for example, recovery straps, shovels, SUV or pickup-truck with 4-wheel drive, snow tires, etc. The system finds that Craig, who is friends with Tom on BUSINESS NET, a social network service, and is closer than any other trusted assistant (for example, two blocks away), has the necessary listed equipment and vehicle to help Tom, and informs Tom of the identity of Craig and his location, and his trusted assistant rating. Tom decides that it is acceptable to ask Craig for help (based on personal knowledge of Craig, or the rating value if he doesn't know Craig personally), and instructs the embodiment to request help from Craig, which responsively sends Craig a request notification: "Tom Link, a connection of yours on BUSINESS NET, is stuck in a snow bank at Sherbrooke and Guy. Are you able to assist?" In response to Craig accepting, the embodiment notifies Tom with an ETA, or plots his location on a mapping app display to Tom, who can track Craig's location and progress, and automatically sends Tom's vehicle GPS vehicle coordinate data to Craig's mobile phone or in-car navigation system, which routes him to Tom's location.

In another example Lisa's car is stalled. She needs a jump to start her car. Her car senses the problem and sends a signal to an embodiment of the present invention for assistance, which searches the trusted assistant knowledge base for people with appropriate skills (mechanical experience, and user ratings), equipment (jumper cables or jump start battery kit), and locations close to Lisa. The embodiment finds and suggests Mike to Lisa as the closest trusted assistant, located one kilometer away. Mike is a second-degree social network contact of Lisa (through common membership in a local Parent-Teacher Association organization) and is not personally known to Lisa (they have never met).

Lisa decides to accept the recommendation, based on his very close location, and deciding that Mike is likely trustworthy based on his high rating from other users. Further, some embodiments provide extra safety and assurance features, such as by tracking and logging all movements of Mike in association to his identity. Some embodiments incorporate audio and video records of the rendered service acquired through mobile phone camera and microphones of Lisa and/or Mike during rendering of the service, which helps to protect both Mike and Lisa from losses or damage arising from problems arising while Mike helps Lisa, wherein appropriate culpability from accidental damage may be determined based on the logged data.

Thus, Mike receives the request and accepts it, and quickly comes to Lisa's assistance with the jumpers to start car, and wherein Lisa has her car running and the heater functional within ten minutes, is far less time than could be achieved by a conventional, prior art roadside assistance program available to Lisa which has an estimate ETA of one hour.

In another example, Heather gets a flat tire and posts her status on her social media account. An embodiment of the present invention monitors social media and identifies that Heather needs help (by text analysis of her post). The embodiment finds that Tyler is the nearest, competent trusted assistant with respect to Heather's problem, and Heather accepts the suggestion of requesting help from Tyler, even though Tyler is not part of a direct social network of Heather. Tyler agrees to help and responds to Heather's location and helps her. Thus, the embodiment finds Tyler, a timely resource to help who was previously, entirely unknown to Heather, and thus would not be available to help Heather without the use of the present invention.

Thus, embodiments of the present invention solve problems faced in the prior art when a vehicle operator experiences a breakdown but conventional roadside assistance options are too busy or too far away to provide a reasonable ETA, exposing the vehicle operator to risk from being struck by another vehicle, or from dangerous exposure to deleterious environmental elements (snow, below freezing temperatures, extreme heat or sun or wind exposures, etc.) without adequate protections (warm clothing, shade from the sun, water, etc. Embodiments of the present invention dynamically and quickly identify resources that are otherwise unknown to the vehicle operator or to prior art systems, finding a social contact or other "trusted assistant" person that is available and able to respond within a reasonable ETA, that has the appropriate and needed skill sets and equipment, and has already (previously) indicated their willingness to help (by agreeing to register as a trusted assistant), thereby saving additional response time lost in the prior art through iteratively requesting help serially through a number of services or people that each decline. Embodiments autonomously generate and (with permission) send amber-type alerts or notifications to trusted people within the social networks, or extensions thereof, of the vehicle operator.

Embodiments assist people by detecting issues that are encountered with a vehicle, and further by determining appropriate, verified or registered trusted assistants that are both nearby and capable of assisting. While embodiments may give preference to people that are part of a trusted social network, they may also extend assistance requests to non-verified people as needed (for example, in response to determining that ETA's for preferred people are too long in view of critical health or exposure hazard conditions associated with the request for assistance). Embodiments notify the best qualified people, determined by skills set and equipment capabilities, and time availability, and ask for their assistance. Upon positive confirmation the system will direct those people to the target location.

The terminology used herein is for describing aspects only and is not intended to be limiting of the invention. As used herein, singular forms "a", "an", and "the" are intended to include the plural forms as well, unless the context clearly indicates otherwise. It will be further understood that the terms "include" and "including" when used in the specification specify the presence of stated features, integers, steps, operations, elements, and/or groups thereof. Certain examples and elements described in the present specification, including in the claims, and as illustrated in the figures, may be distinguished, or otherwise identified from others by unique adjectives (e.g. a "first" element distinguished from a "second" or "third" of a plurality of elements, a "primary" distinguished from a "secondary" one or "another" item, etc.) Such identifying adjectives are generally used to reduce confusion or uncertainty and are not to be construed to limit the claims to any specific illustrated element or embodiment, or to imply and precedence, ordering, or ranking of any certain elements, limitations, or process steps.

The descriptions of the various embodiments of the present invention have been presented for the purposes of illustration but are not intended to be exhaustive or limited to the embodiments disclosed. Many modifications and variations will be apparent to those of ordinary skill in the art without departing for the scope and spirit of the described embodiments. The terminology used herein was chosen to best explain the principles of the embodiments, the practical applications or technical improvement over technologies found in the marketplace, or to enable others of ordinary skill in the art to understand the embodiments disclosed herein.

What is claimed is:

1. A computer-implemented method, comprising:
mining online data sources using a computing system to identify purchasers of vehicle repair items that have remote location assistance type attribute values;
identifying users of the purchasers of the vehicle repair items as trusted assistant candidates for a vehicle operator in response to determining that they are linked to the vehicle operator as first-degree social network contacts within a social network, wherein the first-degree social network contacts are selected from a friend contact and a family contact;
determining that the vehicle requires remote location assistance comprising:
communicating a diagnostic query to a vehicle system comprising a vehicle sensor;
receiving a signal from the vehicle system comprising the vehicle sensor in response to the diagnostic query, wherein the signal is representative of a vehicle sensor data value indicative of the vehicle requiring remote location assistance;
monitoring, in real-time, text content values associated with the vehicle operator mined from posted data on the social network which are indicative of the vehicle operator or vehicle requiring remote location assistance; and
identifying the vehicle operator or the vehicle requiring remote location assistance based on correlating the computer-implemented text content analysis of posted data on the social network to the signal;
determining a current geographic location of the vehicle using a vehicle coordinate data value of the vehicle obtained from a global position system;
in response to the determining that the vehicle operator needs remote location assistance based on the computer-implemented text content analysis of mined posted data on the social network, selecting one of the trusted assistant candidates that is located closest to the vehicle location relative to remaining others of the trusted assistant candidates based on the vehicle coordinate data value of the vehicle obtained from a global position system;
sending the coordinate data value of the current geographic vehicle location of the vehicle to a navigation system associated with a device of the selected one of the trusted assistant candidates;
routing the selected one of the trusted assistant candidates to the current geographic vehicle location by using the navigation system associated with the device that received the current geographic vehicle location of the vehicle; and
dispatching the selected one of the trusted assistant candidates to the vehicle location to provide remote location assistance to the vehicle operator.

2. The method of claim 1, further comprising:
in response to receiving a signal from the vehicle system comprising the vehicle sensor in response to the diagnostic query, communicating a positioning query to the global position system associated with the vehicle;
in response to the positioning query, receiving a positioning signal from the global position system comprising vehicle position data;
in response to receiving the positioning signal from the global position system comprising vehicle position data, determining that the vehicle is stationary by comparing the positioning signal to geographical data;

in response to determining that the vehicle sensor data value is indicative of one of a critical health condition and an exposure hazard condition and that the vehicle is stationary, determining estimated times of arrival for each of the first-degree social network contacts to the current geographic vehicle location;

in response to determining that the estimated times of arrival for the first-degree social network contacts exceed a threshold value, identifying ones of the purchasers of the vehicle repair items that are not linked to the vehicle operator as first-degree social network contacts within the social network as trusted assistant candidates for the vehicle operator;

determining skill set values for each of the trusted assistant candidates as a function of ratings by social network contacts with respect to activity relevant to usage of the vehicle repair items;

assigning the skill set values to the first-degree social network contacts associated with each of the trusted assistant candidates in a database;

comparing the skill set values of the first-degree social network contacts; and selecting the one of the trusted assistant candidates from a subset of the trusted assistant candidates that have assigned skill set values that meet a minimum quality threshold.

3. The method of claim 2, further comprising:

registering ones of the trusted assistant candidates as registered trusted assistants in response to determining that the registered ones have determined skill set values that meet the minimum quality threshold and agree to allow tracking of their availability and location;

selecting the one of the trusted assistant candidates from the registered trusted assistants;

communicating instructions to display a route and the text content values which are indicative of the vehicle operator or vehicle requiring remote location assistance on the device to the current geographic vehicle location by using the navigation system associated with the device that received the current geographic vehicle location of the vehicle; and communicating a short message service (SMS) text message to a device of the vehicle operator indicating that the selected one of the trusted assistant candidates has been routed to the current geographic vehicle location.

4. The method of claim 2, further comprising:

determining that a type of the remote location assistance that the vehicle requires is accident assistance as a function of determining that the vehicle sensor data value is indicative of one of a water submersion, a sound associated accident data, a motion associated to accident data, a fire impingement, a tire pressure value below a threshold value, and a vehicle fluid loss that exceeds a threshold; and determining that the type of the remote location assistance is towing assistance as a function of determining that the vehicle sensor data value indicates that a vehicle engine is not running and that an available power within a vehicle battery is insufficient to start the vehicle engine; and displaying a route on the device to the current geographic vehicle location by using the navigation system associated with the device that received the current geographic vehicle location of the vehicle.

5. The method of claim 4, further comprising:

determining the skill set values for each of the trusted assistant candidates in proportion to amounts that the remote location assistance type attribute values of the vehicle repair items purchased by the trusted assistant candidates match the determined type of the remote location assistance that the vehicle requires at the vehicle location;

selecting the one of the trusted assistant candidates that has the highest determined skill set value that is located closest to the vehicle location; and communicating a short message service (SMS) text message to the device communicating the need for remote location assistance.

6. The method of claim 5, further comprising:

determining probabilities that the trusted assistant candidates purchased the vehicle repair items that match the need of the remote location assistance at the vehicle location as a function of purchase activity of related vehicle repair items; and determining the skill set values for each of the trusted assistant candidates in proportion to the determined probabilities that the trusted assistant candidates purchased the vehicle repair items that match the need of the remote location assistance at the vehicle location; and mapping the skill set values to the trusted assistant candidates as a function of ratings from other social network users with respect to activity including usage of the vehicle repair items.

7. The method of claim 1, further comprising:

integrating computer-readable program code into a computer system comprising a processor, a computer readable memory in circuit communication with the processor, and a computer readable storage medium in circuit communication with the processor; and wherein the processor executes program code instructions stored on the computer readable storage medium via the computer readable memory and thereby performs the mining the online data sources to identify the purchasers of vehicle repair items, the identifying the users purchasers of the vehicle repair items as the trusted assistant candidates, the determining that the vehicle requires remote location assistance as the function of the vehicle sensor data value, the determining a current geographic location of the vehicle, the selecting the one of the trusted assistant candidates, the sending the coordinate data value to the navigation system, the routing via the navigation system to the current geographic vehicle location, and the dispatching the selected one of the trusted assistant candidates to the vehicle location to provide remote location assistance to the vehicle operator.

8. The method of claim 7, wherein the computer-readable program code is provided as a service in a cloud environment and wherein the determining that the vehicle requires remote location assistance comprises directly determining the occurrence of maintenance issue to resolve from the sensor data that requires remote location assistance.

9. A computer system for a navigation system, comprising:

a processor;

a computer readable memory in circuit communication with the processor; and a computer readable storage medium in circuit communication with the processor;

wherein the processor executes program instructions stored on the computer-readable storage medium via the computer readable memory and thereby:

mines online data sources to identify purchasers of vehicle repair items that have remote location assistance type attribute values;

identifies ones of the purchasers of the vehicle repair items as trusted assistant candidates for a vehicle operator in response to determining links to the vehicle operator as first-degree social network contacts within a social network, wherein the first-degree social network contacts are selected from a friend contact and a family contact;

determines that the vehicle requires remote location assistance comprising:
  communicating a diagnostic query to a vehicle system comprising a vehicle sensor;
  receiving a signal from the vehicle system comprising the vehicle sensor in response to the diagnostic query, wherein the signal is representative of a vehicle sensor data value indicative of the vehicle requiring remote location assistance; and
  monitoring, in real time, text content values associated with the vehicle operator mined from posted data on the social network which are indicative of the vehicle operator or vehicle requiring remote location assistance; and
  identifying the vehicle operator or the vehicle requiring remote location assistance based on correlating the computer-implemented text content analysis of posted data on the social network to the signal;

determines a current geographic location of the vehicle using vehicle coordinate data value of the vehicle obtained from a global position system;

in response to determining that the vehicle operator needs remote location assistance based on the computer-implemented text content analysis of mined posted data on the social network, selects a one of the trusted assistant candidates that is located closest to the vehicle location relative to remaining others of the trusted assistant candidates based on the vehicle coordinate data value of the vehicle obtained from a global position system;

sends the coordinate data value of the current geographic vehicle location of the vehicle to a navigation system associated with a device of the selected one of the trusted assistant candidates;

routes the selected one of the trusted assistant candidates to the current geographic vehicle location by using the navigation system associated with the device that received the current geographic vehicle location of the vehicle;

dispatches the selected one of the trusted assistant candidates to the vehicle location to provide remote location assistance to the vehicle operator; and in response to the selected one of the trusted assistant candidates accepting to assist the vehicle, providing a user with tracking information of a location of the selected one of the trusted assistant candidates in a display of a mapping application of the user.

10. The system of claim 9, wherein the processor executes the program instructions stored on the computer-readable storage medium via the computer readable memory and thereby:

in response to determining that the vehicle sensor data value is indicative of one of a critical health condition and an exposure hazard condition, determines estimated times of arrival for each of the first-degree social network contacts to the current geographic vehicle location;

in response to determining that the estimated times of arrival for the first-degree social network contacts exceed a threshold value, identifies ones of the purchasers of the vehicle repair items that are not linked to the vehicle operator as first-degree social network contacts within the social network as trusted assistant candidates for the vehicle operator;

determines skill set values for each of the trusted assistant candidates as a function of ratings by social network contacts with respect to activity relevant to usage of the vehicle repair items; and selects the one of the trusted assistant candidates from a subset of the trusted assistant candidates that have determined skill set values that meet a minimum quality threshold.

11. The system of claim 10, wherein the processor executes the program instructions stored on the computer-readable storage medium via the computer readable memory and thereby:

registers ones of the trusted assistant candidates as registered trusted assistants in response to determining that the registered ones have determined skill set values that meet the minimum quality threshold and agree to allow tracking of their availability and location; and selects the one of the trusted assistant candidates from the registered trusted assistants.

12. The system of claim 10, wherein the processor executes the program instructions stored on the computer-readable storage medium via the computer readable memory and thereby:

determines that a type of the remote location assistance that the vehicle requires is accident assistance as a function of determining that the vehicle sensor data value is indicative of one of a water submersion, a sound associated accident data, a motion associated to accident data, a fire impingement, a tire pressure value below a threshold value, and a vehicle fluid loss that exceeds a threshold; and determines that the type of the remote location assistance is towing assistance as a function of determining that the vehicle sensor data value indicates that a vehicle engine is not running and that an available power within a vehicle battery is insufficient to start the vehicle engine.

13. The system of claim 12, wherein the processor executes the program instructions stored on the computer-readable storage medium via the computer readable memory and thereby:

determines the skill set values for each of the trusted assistant candidates in proportion to amounts that the remote location assistance type attribute values of the vehicle repair items purchased by the trusted assistant candidates match the determined type of the remote location assistance that the vehicle requires at the vehicle location; and selects the one of the trusted assistant candidates that has the highest determined skill set value that is located closest to the vehicle location.

14. The system of claim 13, wherein the processor executes the program instructions stored on the computer-readable storage medium via the computer readable memory and thereby:

determines probabilities that the trusted assistant candidates purchased the vehicle repair items that match the need of the remote location assistance at the vehicle location as a function of purchase activity of related vehicle repair items; and determines the skill set values for each of the trusted assistant candidates in proportion to the determined probabilities that the trusted assistant candidates purchased the vehicle repair items that match the need of the remote location assistance at the vehicle location.

15. A computer program product for a navigation system, comprising:

a computer readable storage medium having computer readable program code embodied therewith, the computer readable program code comprising instructions for execution by a processor that cause the processor to:

mine online data sources to identify purchasers of vehicle repair items that have remote location assistance type attribute values;

identify ones of the purchasers of the vehicle repair items as trusted assistant candidates for a vehicle operator in response to determining links to the vehicle operator as first-degree social network contacts within a social network, wherein the first-degree social network contacts are selected from a friend contact and a family contact;

determine that the vehicle requires remote location assistance comprising:

communicating a diagnostic query to a vehicle system comprising a vehicle sensor;

receiving a signal from the vehicle system comprising the vehicle sensor in response to the diagnostic query, wherein the signal is representative of a vehicle sensor data value indicative of the vehicle requiring remote location assistance; and monitoring, in real time, text content values associated with the vehicle operator mined from posted data on the social network which are indicative of the vehicle operator or vehicle requiring remote location assistance; and identifying the vehicle operator or the vehicle requiring remote location assistance based on correlating the computer-implemented text content analysis of posted data on the social network to the signal;

determine a current geographic location of the vehicle using vehicle coordinate data value of the vehicle obtained from a global position system;

in response to determining that the vehicle operator needs remote location assistance at a vehicle location based on the computer-implemented text content analysis of mined post data on the social network, select a one of the trusted assistant candidates that is located closest to the vehicle location relative to remaining others of the trusted assistant candidates based on the vehicle coordinate data value of the vehicle obtained from a global position system;

send the coordinate data value of the current geographic vehicle location of the vehicle to a navigation system associated with a device of the selected one of the trusted assistant candidates;

route the selected one of the trusted assistant candidates to the current geographic vehicle location by using the navigation system associated with a device that received the current geographic vehicle location of the vehicle;

dispatch the selected one of the trusted assistant candidates to the vehicle location to provide remote location assistance to the vehicle operator;

in response to the selected one of the trusted assistant candidates accepting to assist the vehicle, providing a user with tracking information of a location of the selected one of the trusted assistant candidates in a display of a mapping application of the user;

register the trusted assistant candidates that have a minimum quality threshold skill set and equipment ownership confidence values; and provide a rating of attributes of the selected trusted assistant candidate based on performance ratings in rendering a requested service or feedback from a vehicle operator.

16. The computer program product of claim 15, wherein the computer readable program code instructions for execution by the processor further cause the processor to:

in response to determining that the vehicle sensor data value is indicative of one of a critical health condition and an exposure hazard condition, determine estimated times of arrival for each of the first-degree social network contacts to the current geographic vehicle location;

in response to determining that the estimated times of arrival for the first-degree social network contacts exceed a threshold value, identify ones of the purchasers of the vehicle repair items that are not linked to the vehicle operator as first-degree social network contacts within the social network as trusted assistant candidates for the vehicle operator;

determine skill set values for each of the trusted assistant candidates as a function of ratings by social network contacts with respect to activity relevant to usage of the vehicle repair items; and select the one of the trusted assistant candidates linked to the vehicle operator from a subset of the trusted assistant candidates that have determined skill set values that meet a minimum quality threshold.

17. The computer program product of claim 16, wherein the computer readable program code instructions for execution by the processor further cause the processor to:

register ones of the trusted assistant candidates as registered trusted assistants in response to determining that the registered ones have determined skill set values that meet the minimum quality threshold and agree to allow tracking of their availability and location; and select the one of the trusted assistant candidates from the registered trusted assistants.

18. The computer program product of claim 16, wherein the computer readable program code instructions for execution by the processor further cause the processor to:

determine that a type of the remote location assistance that the vehicle requires is accident assistance as a function of determining that the vehicle sensor data value is indicative of one of a water submersion, a sound associated accident data, a motion associated to accident data, a fire impingement, a tire pressure value below a threshold value, and a vehicle fluid loss that exceeds a threshold; and determine that the type of the remote location assistance is towing assistance as a function of determining that the vehicle sensor data value indicates that a vehicle engine is not running and that an available power within a vehicle battery is insufficient to start the vehicle engine.

19. The computer program product of claim 18, wherein the computer readable program code instructions for execution by the processor further cause the processor to:
- determine the skill set values for each of the trusted assistant candidates in proportion to amounts that the remote location assistance type attribute values of the vehicle repair items purchased by the trusted assistant candidates match the determined type of the remote location assistance that the vehicle requires at the vehicle location; and
- select the one of the trusted assistant candidates that has the highest determined skill set value that is located closest to the vehicle location.

20. The computer program product of claim 19, wherein the computer readable program code instructions for execution by the processor further cause the processor to:
- determine probabilities that the trusted assistant candidates purchased the vehicle repair items that match the need of the remote location assistance at the vehicle location as a function of purchase activity of related vehicle repair items; and
- determine the skill set values for each of the trusted assistant candidates in proportion to the determined probabilities that the trusted assistant candidates purchased the vehicle repair items that match the need of the remote location assistance at the vehicle location.

* * * * *